Aug. 19, 1930.  R. HUGERSHOFF  1,773,309

OVERLAP REGULATOR FOR SEQUENCE PICTURE MAKERS

Filed Aug. 30, 1929

Inventor:
R. Hugershoff
By: Marks & Clerk
Attys.

Patented Aug. 19, 1930

1,773,309

UNITED STATES PATENT OFFICE

REINHARD HUGERSHOFF, OF DRESDEN, GERMANY, ASSIGNOR TO THE FIRM IKARUS INTERNATIONALE PATENTVERWERTUNGS-AKTIEN-GESELLSCHAFT, OF VADUZ, LIECHTENSTEIN, GERMANY

OVERLAP REGULATOR FOR SEQUENCE-PICTURE MAKERS

Application filed August 30, 1929, Serial No. 389,592, and in Germany June 7, 1929.

A device for regulating the overlapping of successive aerial photographs taken in an almost vertical downward direction is already known, in which a cylinder revolving in the image plane of an objective lens is employed, a helical line being marked on the cylinder. The speed of revolution of the cylinder is so regulated that the speed of the apparent displacement of the helical line is equivalent to the speed with which the image of the landscape travels through the image field of the objective lens. Since the pitch of the helical line is constant, the resultant speed of the driving shaft produces quite a definite overlap of the successive pictures of a series, and corresponds, when the appliance is employed as a speedometer, to quite a definite flying height.

If it is desired to produce with the appliance a different overlapping ratio, the cylinder with the helical line must be exchanged for another cylinder with a helical line of a different pitch. The pitch must for instance be greater, if a smaller overlap is prescribed, that is to say, when the photographs are to succeed one another more slowly, corresponding to the circumstance that with a greater pitch of the helical line the cylinder carrying that line must revolve more slowly in order that the helical line with a now greater pitch may have the same apparent velocity of displacement as the image of the landscape.

In order to avoid changing the cylinder provided with the helical line, according to the present invention the helical line is constructed as an elastic extensible spiral which is so arranged that it participates in the rotation of its cylindrical carrier, and during the rotation can be expanded at will. If such a device is employed as a speedometer, when the extensible spiral is employed, the special speed regulator to be adjusted according to the flying height can be dispensed with. This is a very important advantage, since, as known, all devices for continuously regulating a speed present considerable technical difficulties. By merely altering the tension of the spiral, an increase or diminution in the pitch of the helical line is now obtained quite continuously and in a very simple manner, and with it an increase or diminution in the apparent speed of displacement of the helical line.

Figure 1:
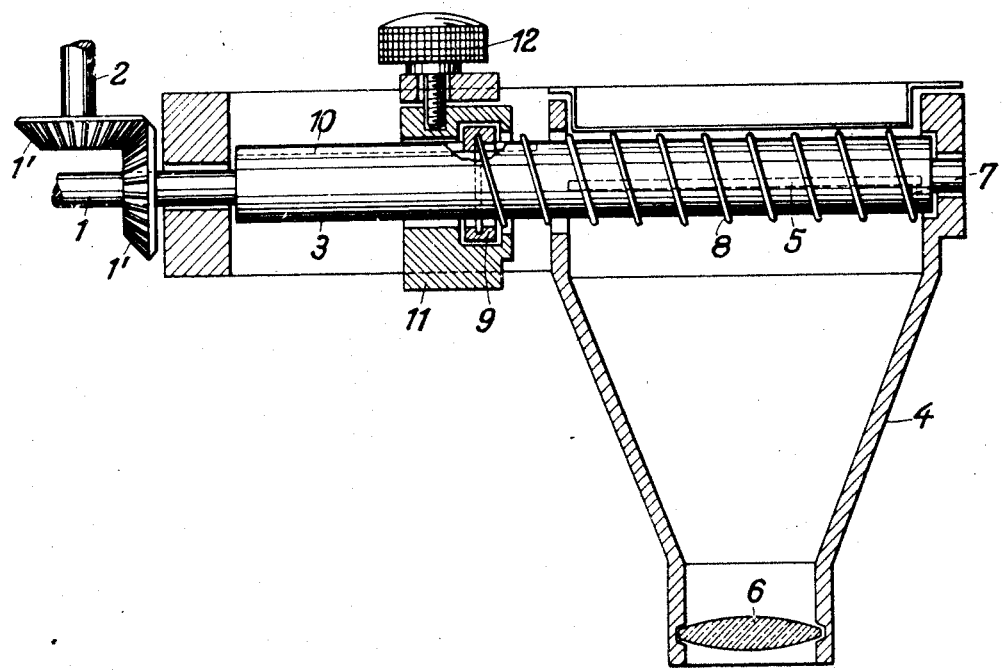
Figure 2:
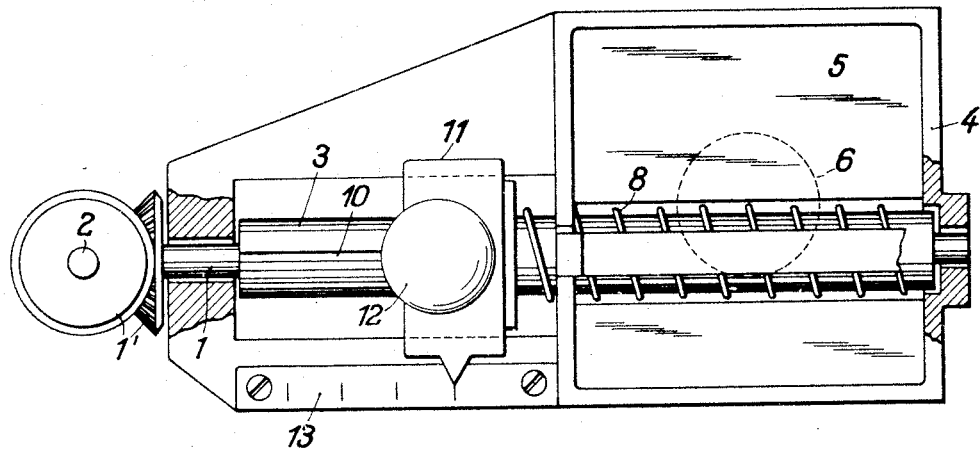

One constructional example of the invention is illustrated in the accompanying drawings, in which Fig. 1 shows a longitudinal section, partly in outside elevation and Fig. 2 shows a plan of the device.

Upon a driving shaft 1, which drives a driving shaft 2 by means of bevel gear 1', is arranged a cylindrical body 3, which is so supported in a chamber-like casing 4 that its axis coincides with the image plane 5 of an objetve lens 6, constituted by a suitably interrupted ground glass plate. To the cylinder 3 is secured at 7.one end of a wire spiral 8. The other end is fitted to a ring 9, which is slidable along the cylinder 3 and which, by means of a guiding groove 10, participates in the rotation of the cylinder 3. The displacement of the sliding ring 9 is effected by means of a guiding ring 11, which can be held fast in any desired position by a clamping screw 12. The position at any given time is read off by means of a pointer on a scale 13, shown in Fig. 2, the scale being graduated according to the purpose for which the device is to be employed, either according to the pitch of transmission ratio applicable to the pitch of the helical line, or according to the corresponding difference in flying height.

What I claim is:

1. An overlap regulator for sequence picture makers, comprising an objective lens adapted to form an image of a tract of country over which the sequence picture making is moving, a cylinder rotatably mounted in the neighbourhood of the image field plane of the objective lens, an elastic spiral of variable pitch mounted on the cylindrical surface of the said cylinder, and means for varying the pitch of the elastic spiral while it is revolving with the cylinder on which it is mounted.

2. An overlap regulator for sequence picture makers, comprising an objective lens adapted to form an image of a tract of country over which the sequence picture maker is moving, the said lens being fixedly connected with the sequence picture maker, a cylinder rotatably mounted in the neighbourhood of the image field plane of the objective lens, an elastic spiral of variable pitch mounted on the cylindrical surface of the said cylinder, and means for varying the pitch of the elastic spiral while it is revolving with the cylinder on which it is mounted.

In testimony whereof I have signed my name to this specification.

REINHARD HUGERSHOFF.